United States Patent [19]
Sakamoto

[11] Patent Number: 5,192,599
[45] Date of Patent: Mar. 9, 1993

[54] STRUCTURE FOR FIXING CARPET ON VEHICULAR FLOOR PANEL

[75] Inventor: Manabu Sakamoto, Kanagawa, Japan

[73] Assignee: Ikeda Bussan Co., Ltd., Ayase, Japan

[21] Appl. No.: 764,637

[22] Filed: Sep. 24, 1991

[30] Foreign Application Priority Data

Sep. 26, 1990 [JP] Japan .................. 2-100613[U]

[51] Int. Cl.⁵ .................. B32B 3/02; B32B 33/00; B32B 23/02; A47G 27/04
[52] U.S. Cl. .................. 428/82; 428/88; 428/95; 428/192; 16/4; 16/7; 16/16
[58] Field of Search .......... 428/88, 82, 192, 95; 16/4, 7, 16

[56] References Cited

U.S. PATENT DOCUMENTS

| 19,164 | 1/1858 | Wakefield | 16/4 |
|---|---|---|---|
| 2,032,499 | 3/1936 | Place | 16/4 X |
| 2,142,729 | 1/1939 | Knowland et al. | 428/88 |
| 2,166,578 | 7/1939 | Bernhardt | 16/16 |
| 3,208,095 | 9/1965 | Hill | 16/16 |
| 3,669,817 | 6/1972 | McDevitt | 428/82 |
| 4,054,698 | 10/1977 | Hamrah | 428/88 |
| 4,382,986 | 5/1983 | Reuben | 428/88 |
| 4,758,457 | 7/1988 | Altus | 428/82 |
| 4,921,742 | 5/1990 | Altus | 428/95 X |

FOREIGN PATENT DOCUMENTS

| 834046 | 5/1960 | United Kingdom . |
|---|---|---|
| 971512 | 9/1964 | United Kingdom . |
| 1171250 | 11/1969 | United Kingdom . |
| 1228767 | 4/1971 | United Kingdom . |
| 2115692A | 9/1983 | United Kingdom . |
| 2217197A | 10/1989 | United Kingdom . |

Primary Examiner—George F. Lesmes
Assistant Examiner—Terrel Morris
Attorney, Agent, or Firm—Foley & Lardner

[57] ABSTRACT

A structure for fixing a carpet on a vehicular floor panel includes an elongate retainer for retaining the carpet on the floor panel, and a covering member for covering a front end portion of the carpet and a front end portion of the retainer. The retainer is detachably fixed to the floor panel and located below the carpet to be concealed by the carpet. The front end portion of the carpet and the front end portion of the retainer are sewn together with the covering member, such that the carpet is secured at its front end portion thereof to the retainer.

15 Claims, 3 Drawing Sheets

STRUCTURE FOR FIXING CARPET ON VEHICULAR FLOOR PANEL

BACKGROUND OF THE INVENTION

1. Field of the Invention

The present invention relates in general to a structure for fixing a carpet on a vehicular floor panel, and more particularly to a structure for fixing a carpet on a vehicular floor panel, for example, of the luggage space of a station wagon type motor vehicle.

2. Description of the Prior Art

In order to clarify the task of the present invention, one conventional structure for fixing a carpet on a vehicular floor panel will be outlined with reference to FIGS. 5 and 6 of the accompanying drawings.

As is seen from FIG. 5, designated by numeral 10 is a so-called luggage space, for example, of a station wagon type motor vehicle for stowing bulky items therein. The luggage space 10 is provided behind a rear seat 12. The luggage space 10 is usually equipped with a carpet 14 for covering a floor panel 16 of the luggage space 10. The floor panel 16 is formed at a transversely extending front portion thereof with four spaced through holes 18. The carpet 12 is so shaped as to conform to the peripheral shape of the floor panel 16 of the luggage space 10. The carpet 12 has four spaced through holes 20 so as to be mated with the holes 18 of the floor panel 16.

As is seen from FIG. 6, four pins 22 each are received in the aligned holes 20 and 18 of the carpet 12 and the floor panel 16. Each pin 22 has a circular head portion 22a which is placed on the carpet 12 and a stem portion 22b and a tapered portion 22c. To put the pin 22 into the holes 20 and 18, the tapered portion 22c of the pin 22 is thrust into the holes 20 and 18.

However, the above-mentioned conventional structure for fixing the carpet 12 on the floor panel 16 has the following drawbacks.

First, the head portion 22a of each pin 22 is exposed on the carpet 12, thereby lowering the external appearances of the carpet 12 and the luggage space 10.

Second, the front portion of the carpet 12 is fixed to the floor panel 16 with only four pins 22. Therefore, front end portions of the carpet 12 which are defined between two adjacent pins 22 tend to be rearwardly turned up. This lowers the external appearance and the durability of the carpet 12.

SUMMARY OF THE INVENTION

It is therefore a general object of the present invention to provide a structure for fixing a carpet on a floor panel which has an improved external appearance as compared with the above-mentioned conventional structure.

It is a more specific object of the present invention to provide a structure for fixing a carpet on a floor panel in which a retainer for fixing the carpet on the floor panel is concealed, thereby improving the external appearances of the carpet and the luggage space.

It is a further specific object of the present invention to provide a structure for fixing a carpet on a floor panel, by which structure a front portion of the carpet is fully fixed on the floor panel so as not to get the front portion turned up.

According to the present invention, there is provided a structure for fixing a carpet on a vehicular floor panel, the structure comprising: an edging member type retainer for retaining the carpet on the floor panel, the retainer being fixed to the floor panel and located below the carpet to be concealed by the carpet; and a covering member for securing the carpet to the retainer.

DESCRIPTION OF THE PREFERRED INVENTION

Figure 1:
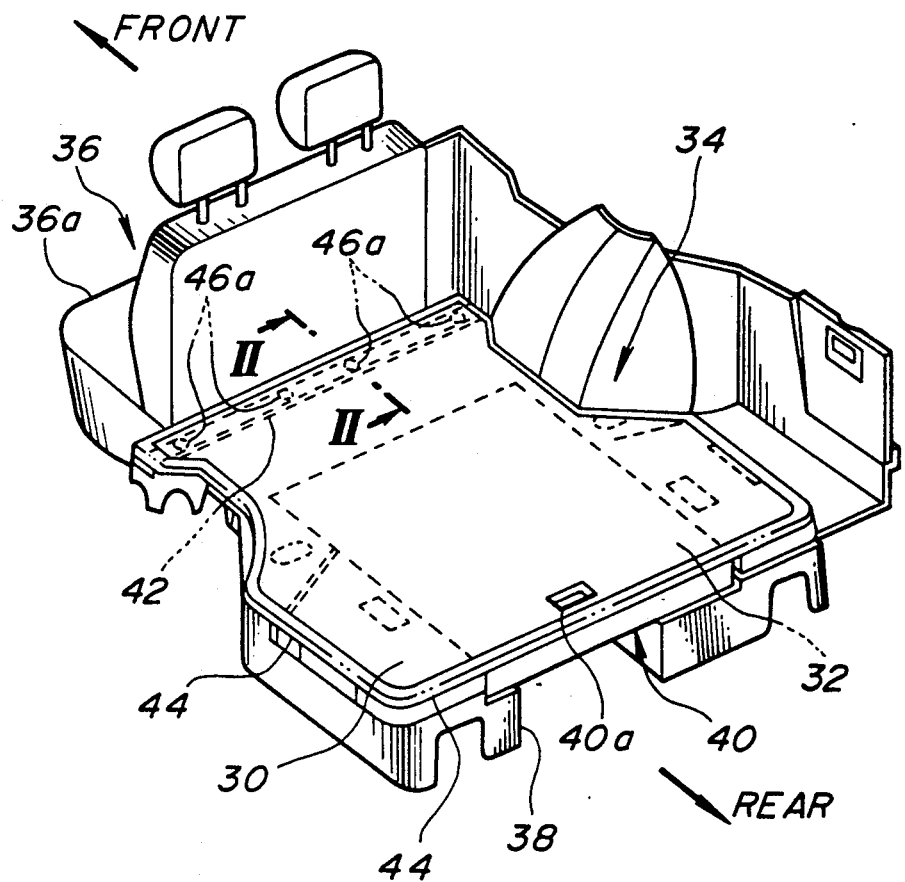
FIG. 1 is a perspective, but partially cutaway, view of a rear body, for example, of a station wagon type motor vehicle, showing a structure for fixing a carpet on a floor panel, which is a first embodiment of the present invention.
Figure 2:
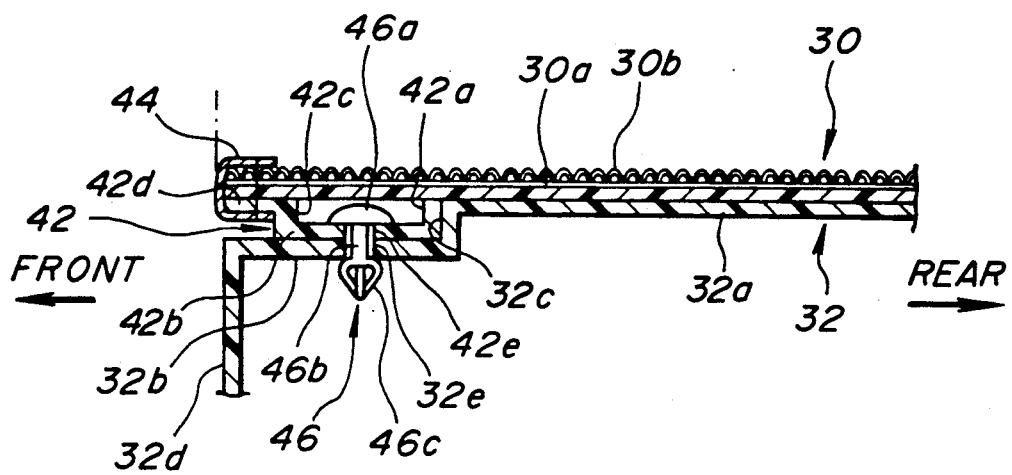
FIG. 2 is an enlarged sectional view taken along the line II—II of FIG. 1.
Figure 3:
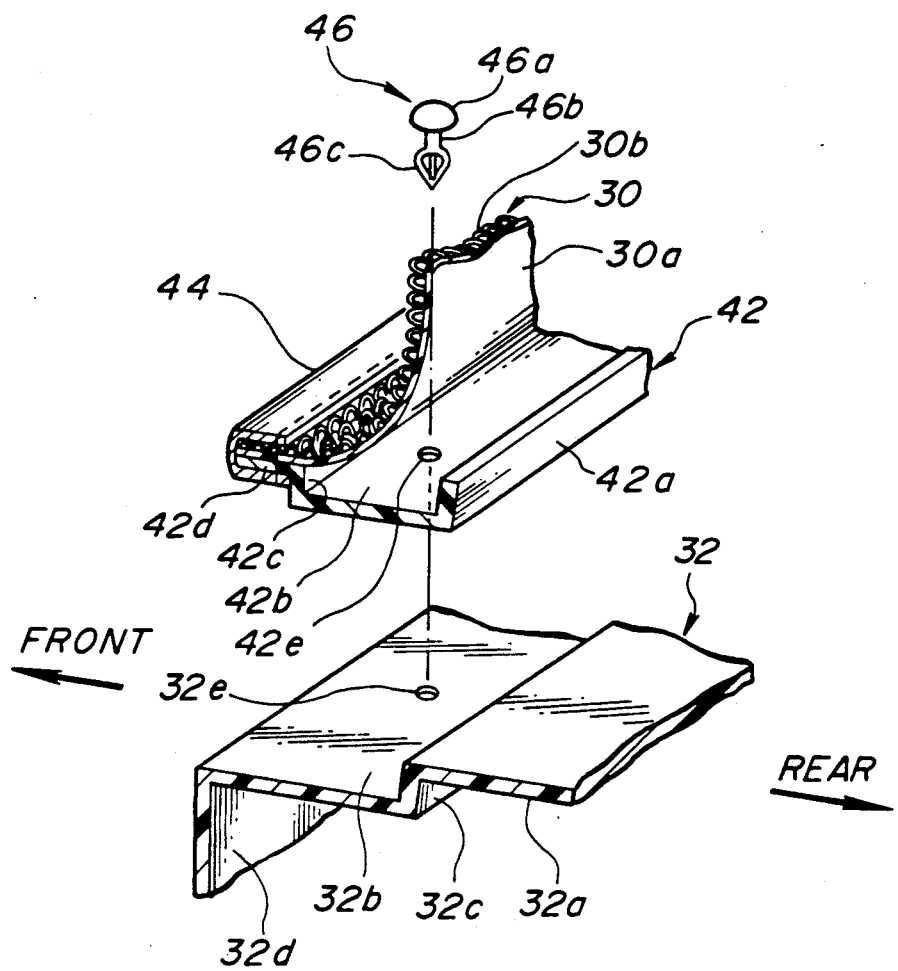
FIG. 3 is an exploded perspective view of FIG. 2.

Referring to FIGS. 1 to 3, there is shown a structure for fixing a carpet 30 on a floor panel 32, which is a first embodiment of the present invention.

As is seen from FIG. 1, for example, a station wagon type motor vehicle has the luggage space 34 behind a rear seat 36 for stowing bulky items therein. A space 38 is provided below the floor panel 32 of the luggage space 34 for stowing a spare tire and the like. The floor panel 32 of the luggage space 34 is formed with a lid member 40 for separating the space 38 from the luggage space 34. When the lid member 40 is closed, an upper surface of the lid member 40 is level with an upper surface of a portion of the floor panel 32 which is positioned adjacent to the lid member 40. The lid member 40 is connected at a front end thereof to the floor panel 32 through a suitable joint (not shown). The lid member 40 is formed at its rear portion with a rectangular through hole 40a for gripping the lid member 40.

As is seen from FIG. 2, the carpet 30 is constructed of a foundation cloth 30a which is made of soft vinyl chloride or the like and a pile fabric 30b which is glued to an upper surface of the foundation cloth 30a.

The floor panel 32 of the luggage room 34 is formed at its transversely extending front end portion with a depressed portion. Thus, the floor panel 32 has a major horizontal wall portion 32a, a front horizontal wall portion 32b, a vertical wall portion 32c which unites the major horizontal wall portion 32a with the front horizontal wall portion 32b, and a vertical front wall portion 32d which is positioned adjacent to a rear surface of a seat cushion 36a of the rear seat 36. The front horizontal wall portion 32b is formed with four through holes 32e.

Designated by numeral 42 is an elongate retainer which has a rear vertical wall portion 42a, a horizontal wall portion 42b, a front vertical wall portion 42c and a front horizontal wall portion 42d. The horizontal wall portion 42b is formed with four through holes 42e. The elongate retainer 42 is placed on the front horizontal wall portion 32b of the floor panel 32 in such a manner that the through holes 42e of the retainer 42 are mated with the holes 32e of the front horizontal wall portion 32b of the floor panel 32, and the rear vertical wall portion 42a of the retainer 42 abuts the vertical wall portion 32c of the floor panel 32. Upper surfaces of the front horizontal wall portion 42d and the rear vertical wall portion 42a of the retainer 42 are level with the upper surface of the major horizontal wall portion 32a of the floor panel 32. Thus, the carpet 30 is placed horizontally on the major horizontal wall portion 32a of the floor panel 32 and the retainer 42. Since the retainer 42 is positioned below the carpet 30, the retainer 42 is concealed.

A covering member 44 which is made of a strip of a nonwoven cloth is bent so as to be C-shaped and to cover a front end portion of the carpet 30 and the front horizontal wall portion 42d of the retainer 42 together. The front end portion of the carpet 30 and the front horizontal wall portion 42d of the retainer 42 are sewn together with the covering member 44.

As is seen from FIG. 1, a peripheral portion of the carpet 30 except the front end portion thereof is also covered with and sewn together with the covering member 44.

As is seen from FIG. 2, four pins 46 each are received in the holes 42e of the retainer 42 and the holes 32e of the floor panel 32 so as to fix the retainer 42 on the floor panel 32. Thus, since the front end portion of the carpet 30 is sewn together with the retainer 42, the carpet 30 is fixed on the floor panel 32. Each pin 46 is formed with a circular head portion 46a, a stem portion 46b and a tapered portion 46c. The head portion 46a is placed on the horizontal wall portion 32b of the retainer 32 and positioned below the carpet 30.

Assembly of the structure for fixing the carpet 30 on the floor panel 32 will be described in detail in the following.

As is seen from FIG. 3, first, the carpet 30 is placed on the retainer 42 in such a manner that the front end portion of the carpet 30 is mated with the front horizontal wall portion 42d of the retainer 42, as is illustrated, the carpet 30 having been cut to as to conform to the peripheral shape of the floor panel 32 of the luggage room 34.

Then, the front end portion of the carpet 30 and the front horizontal wall portion 42d of the retainer 42 are covered with and sewn together the covering member 44.

Then, the peripheral portion of the carpet 30 except the front end portion thereof is covered and sewn together with the covering member 44 without using the retainer 42.

Then, the retainer 42 is placed on the front horizontal wall portion 32b of the floor panel 32 in such a manner that the holes 42e of the retainer 42 are mated with the holes 32e of the front horizontal wall portion 32b of the floor panel 32. Then, the carpet 30 is turned up, as is illustrated in FIG. 3, so as to expose the holes 42e of the retainer 42. Then, the pins 46 are thrust into the holes 42e of the retainer 42 and the holes 32e of the floor panel 32 so as to fix the retainer 42 on the floor panel 32. Therefore, the carpet 30 is fixed to the floor panel 32 through the retainer 42. Then, the carpet 30 is placed on the major horizontal wall portion 32a of the floor panel 32 and the lid member 40.

The advantages of the first embodiment of the present invention will be described in the following.

Each pin 46 is positioned below the carpet 30. Therefore, the pin 46 is not exposed, thereby improving the external appearances of the carpet 30 and the luggage space 34.

Since the head portion 46a of the pin 46 is not exposed on the carpet 30, a smoother upper surface of a floor of the luggage space 34 is obtained, which is desirable for stowing bulky items therein.

Since the front end portion of the carpet 30 is covered with the covering member 44 and fully secured to the retainer 42, and the peripheral portion of the carpet 30 except the front end portion thereof is also covered with the covering member 44, the peripheral portion of the carpet 30 is not turned up easily.

Since the front end portion of the carpet 30 is fully secured to the floor panel 32 through the retainer 42, even when the lid member 40 is opened so as to turn up a rear portion of the carpet 30, the carpet 30 does not get out of its proper position.

Figure 4:
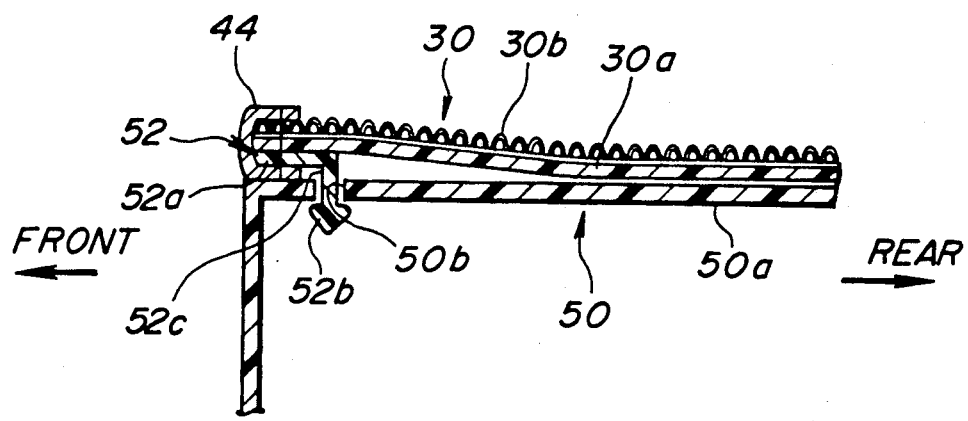
FIG. 4 is a view similar to FIG. 2, but showing a structure for fixing a carpet on a floor panel, which is a second embodiment of the present invention.
Figure 5:
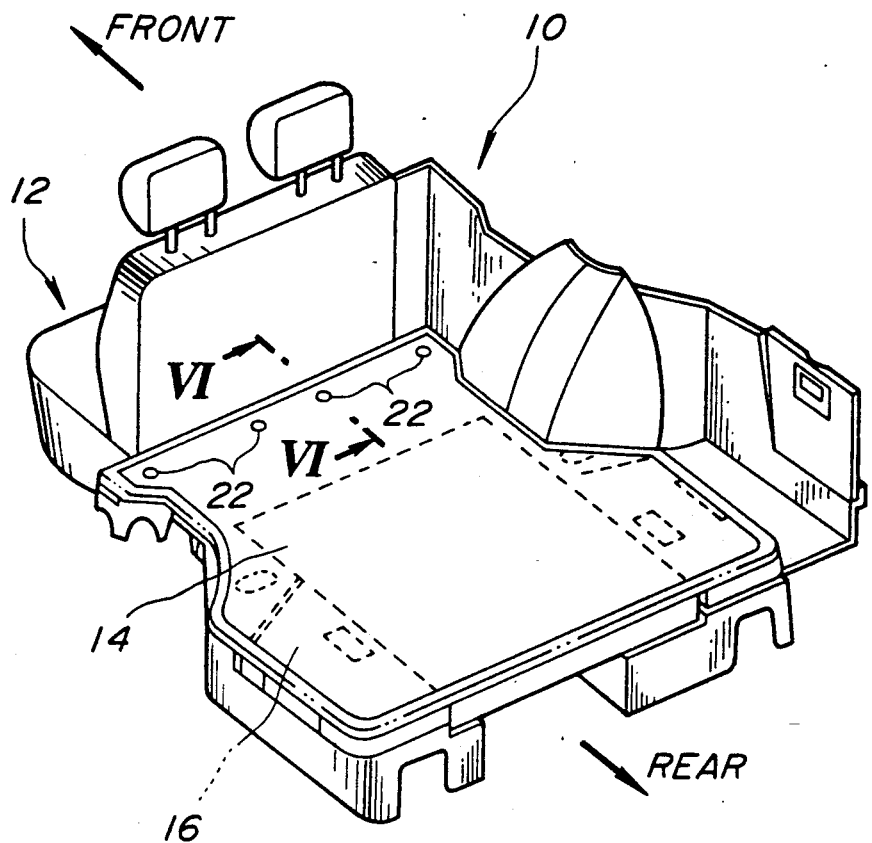
FIG. 5 is a view similar to FIG. 1, but showing a conventional structure for fixing a carpet on a floor panel.
Figure 6:
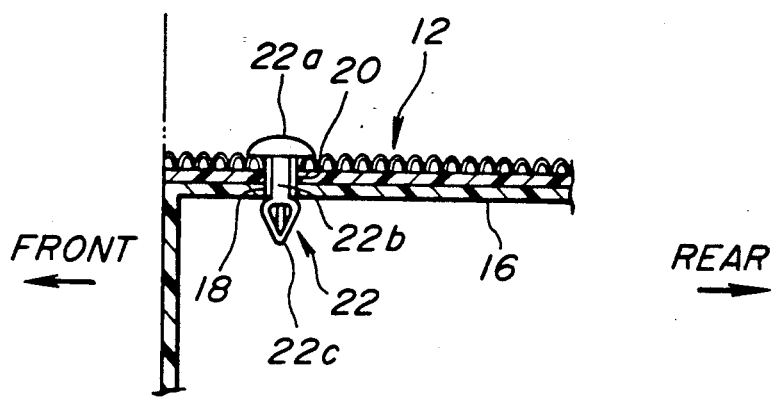
FIG. 6 is an enlarged sectional view taken along the line VI—VI of FIG. 5.

Referring to FIG. 4, there is shown a structure for fixing a carpet on a floor panel, which is a second embodiment of the present invention.

Parts substantially the same as those of the above-mentioned first embodiment are denoted by the same numerals and a detailed explanation of them will be omitted from the following description.

As is seen from FIG. 4, unlike the floor panel 32 of the first embodiment, a floor panel 50 of the luggage space (not shown) does not have a front depressed portion. A horizontal wall portion 50a of the floor panel 50 is formed at its front end portion with four through holes 50b.

An elongate retainer 52 has a horizontal wall portion 52a, four spaced tapered portions 52b, stem portions 52c which unite the tapered portions 52b with a rear end portion of the horizontal wall portion 52a.

The front end portion of the carpet 30 is placed on the horizontal wall portion 52a of the retainer 52. The front end portion of the carpet 30 and the horizontal wall portion 52a of the retainer 52 are covered with and sewn together with the covering member 44. The retainer 52 is received in the holes 50b of the floor panel 50. Thus, the carpet 30 is fixed on the floor panel 50.

The advantages of the second embodiment of the present invention will be described in the following.

Unlike the first embodiment, the clips can be omitted because of the unique structure of the retainer 52. Thus, assembly will be simplified, and the production cost will be lowered. Furthermore, since it not necessary to provide the front depressed portion of the floor panel, the production cost will be lower still.

In the above-mentioned first and second embodiments, the retainer is disposed below only the front end portion of the carpet 30. However, if desired, the retainer may be disposed below all the periphery of the carpet 30.

What is claimed is:

1. A structure for fixing a carpet on a vehicular floor panel, said structure comprising:
    an edging member retainer for retaining a peripheral portion of said carpet on said floor panel, said retainer being fixed to said floor panel by a mechanical fastener and located below said carpet so as to be concealed by said carpet; and
    a covering member for covering a peripheral edge of said peripheral portion of said carpet and an edge portion of said retainer, said peripheral edge of said carpet and said edge portion of said retainer being sewn together with said covering member so as to secure said carpet to said retainer.

2. A structure as claimed in claim 1, in which said carpet is cut so as to conform to a peripheral shape of said floor panel.

3. A structure as claimed in claim 2, in which a major portion of said retainer is interposed between said peripheral portion of said carpet and a peripheral portion of said floor panel.

4. A structure as claimed in claim 1, in which said covering member comprises a strip of a nonwoven cloth.

5. A structure as claimed in claim 3, in which said peripheral edge of said carpet and said edge portion of said retainer are a front edge of said carpet and a front edge portion of said retainer, respectively.

6. A structure as claimed in claim 1, in which said carpet is constructed of a foundation cloth which is made of soft vinyl chloride and a pile fabric which is glued to an upper surface of said foundation cloth.

7. A structure as claimed in claim 1, in which said floor panel comprises a major horizontal wall portion, a first front horizontal wall portion defining said peripheral portion thereof, and a vertical wall portion which unites said major horizontal wall portion with said front horizontal wall portion, and wherein said first front horizontal wall portion has a first through hole.

8. A structure as claimed in claim 7, in which said retainer comprises a rear vertical wall portion, a first horizontal wall portion which has a second through hole mated with said first through hole, a front vertical wall portion, and a second front horizontal wall portion.

9. A structure as claimed in claim 8, in which said mechanical fastener comprises a pin which is received in said mated first and second through holes, and in which said pin is positioned below said carpet.

10. A structure as claimed in claim 9, in which said rear vertical wall portion and said second front horizontal wall portion of said retainer have upper surfaces thereof which are level with an upper surface of said major horizontal wall portion of said floor panel.

11. A structure as claimed in claim 10, in which said peripheral edge of said carpet and said second front horizontal wall portion of said retainer are covered with and sewn together with said covering member, such that said carpet is secured to said retainer.

12. A structure as claimed in claim 1, in which said floor panel comprises a first horizontal wall portion which is formed at a front end portion thereof with a third through hole.

13. A structure as claimed in claim 12, in which said retainer comprises a second horizontal wall portion, a tapered end portion and a stem portion which unites said tapered end portion with said second horizontal wall portion.

14. A structure as claimed in claim 13, in which said tapered end portion is thrust into said third through hole for securing said retainer to said floor panel.

15. A structure as claimed in claim 14, in which said peripheral edge of said carpet and said second horizontal wall portion of said retainer are covered with and sewn together with said covering member.

* * * * *